(12) United States Patent
Ramaswamy et al.

(10) Patent No.: US 12,627,846 B2
(45) Date of Patent: May 12, 2026

(54) JUST IN TIME TRANSCODER SYSTEM, METHOD AND ARCHITECTURE FOR AUDIO AND VIDEO APPLICATIONS

(71) Applicant: igolgi Inc.

(72) Inventors: Kumar Ramaswamy, Pennington, NJ (US); Jeffrey Allen Cooper, Newport Center, VT (US); John William Richardson, Grayslake, IL (US); Joaquín Sergio Lopez Cerro, Barcelona (ES)

(73) Assignee: igolgi Inc., Princeton, NJ (US)

( * ) Notice: Subject to any disclaimer, the term of this patent is extended or adjusted under 35 U.S.C. 154(b) by 0 days.

(21) Appl. No.: 18/887,682

(22) Filed: Sep. 17, 2024

(65) Prior Publication Data

US 2025/0150610 A1 May 8, 2025

Related U.S. Application Data

(60) Provisional application No. 63/629,540, filed on Nov. 6, 2023.

(51) Int. Cl.

| | |
|---|---|
| *H04N 21/239* | (2011.01) |
| *H04N 19/40* | (2014.01) |
| *H04N 21/235* | (2011.01) |
| *H04N 21/442* | (2011.01) |

(52) U.S. Cl.
CPC ......... *H04N 21/2393* (2013.01); *H04N 19/40* (2014.11); *H04N 21/235* (2013.01); *H04N 21/44209* (2013.01)

(58) Field of Classification Search
CPC ... H04N 19/40; H04N 21/235; H04N 21/2393
See application file for complete search history.

(56) References Cited

U.S. PATENT DOCUMENTS

| | | | | |
|---|---|---|---|---|
| 2010/0235658 A1* | 9/2010 | Nishida | ............... | H04W 52/029 |
| | | | | 713/600 |
| 2014/0344443 A1 | 11/2014 | Macinnis | | |
| 2017/0111670 A1* | 4/2017 | Ducloux | ............... | H04N 19/61 |
| 2024/0137587 A1 | 4/2024 | Lintz | | |

* cited by examiner

*Primary Examiner* — On S Mung

(74) *Attorney, Agent, or Firm* — MEAGHER EMANUEL LAKS GOLDBERG & LIAO. LLP

(57) ABSTRACT

Methods, systems and architectures for video and/or audio processing and distribution are described. More particularly, a just in time transcoder/transcoding (JITT) is employed. If a matching optimal asset segment with calculated optimal asset attributes requested by a client device is not stored in a server, the server is configured to invoke the just in time transcoder (JITT) to produce the matching optimal asset segment by transcoding from one or more assets stored in an asset storage device to fulfill the request of client device.

12 Claims, 13 Drawing Sheets

100

100

<u>200</u>

| | Static Ladder | | | Content Aware Ladder | |
|---|---|---|---|---|---|
| | resolution | bitrate (kbps) | | resolution | bitrate (kbps) |
| | 1080p | 3900 | | 1080p | 2285 |
| | 1080p | 3300 | | | |
| | 720p | 2600 | | 720p | 1960 |
| | 540p | 1800 | | | |
| | 540p | 1200 | | | |
| | 360p | 800 | | 480p | 860 |
| | 360p | 650 | | | |
| | 270p | 450 | | 320p | 510 |
| | | | | | |
| Bandwidth Required (kbps) | | 14,700 | | | 5,615 |
| Reduction in Bandwidth(%) | | | | vs static | 62% |

| | Static Ladder | | Content Aware Ladder | | Blazar Ladder | |
|---|---|---|---|---|---|---|
| | resolution | bitrate (kbps) | resolution | bitrate (kbps) | resolution | bitrate (kbps) |
| | 1080p | 3900 | 1080p | 2285 | 1080p | 2285 |
| | 1080p | 3300 | | | | |
| | 720p | 2600 | 720p | 1960 | | |
| | 540p | 1800 | | | | |
| | 540p | 1200 | | | | |
| | 360p | 800 | 480p | 860 | | |
| | 360p | 650 | | | | |
| | 270p | 450 | 320p | 510 | | |
| Bandwidth Required (kbps) | 14,700 | | | 5,615 | | 2,285 |
| Reduction in Bandwidth(%) | | | vs static | 62% | vs static | 84% |
| | | | | | vs content aware | 59% |

JUST IN TIME TRANSCODER SYSTEM, METHOD AND ARCHITECTURE FOR AUDIO AND VIDEO APPLICATIONS

RELATED APPLICATION

This patent application claims the priority and benefits of U.S. Provisional Application No. 63/629,540, filed on Nov. 6, 2023, the disclosure of which is incorporated by reference herein in its entirety.

FIELD OF INVENTION

The present principles relate to video and/or audio processing, and more specifically, to Just-In-Time-Transcoding (JITT) video and/or audio systems and methods.

BACKGROUND INFORMATION

The surge in video streaming services and the increasing reliance on video in all web-related content necessitates the need for affordable, high-quality streaming technology. The varying usage scenarios and deployment situations greatly influence the streaming system costs. For instance, cloud DVR systems can place a substantial financial strain on storage, but the expenses associated with the Content Distribution Network (CDN)/edge distribution architecture should not be overlooked either. Factors such as the application (e.g., DVR, VOD, Live), the quantity of channels or number of media assets stored, the user count, and the CDN or distribution network's architecture/bandwidth all contribute to shaping the system's design and cost centers.

While advancements in various technologies have boosted streaming performance and cost-efficiency, the deployment of streaming systems remains a considerable investment. Content-aware transcoding and just-in-time packaging (JITP) are two technologies that have positively impacted streaming deployments.

BRIEF DESCRIPTION OF THE DRAWINGS

FIG. 2 illustrates an example of a static ABR ladder and a content aware ladder;

FIG. 4 illustrates an example of a Just-In-Time-Transcoder (JITT) ladder compared to standard static or content aware ladders;

DETAILED DESCRIPTION

In this disclosure, we will introduce and discuss "Just-in-Time Transcoding/Transcoder" (JITT). We will explain how a JITT product sets a new standard for affordable video streaming deployment, eases generational codec transitions and enhances video quality and performance for the end-users in the process. An example of such a JITT product is a Blazar Just-in-Time Transcoder being designed by igolgi Inc. of Princeton, NJ.

In addition, another benefit of the Blazar JITT is that it reduces energy consumption per stream, helping to reduce carbon emissions.

ABR Streaming Background

A video streaming system employs a technique known as adaptive bitrate (ABR) encoding. The audio and video streams are first chopped up into small time chunks known as segments. These segments may last anywhere from 2 to 10 seconds (this is only a guideline, not a requirement). The file segments are then encoded into a variety of resolutions and bitrates, referred to as a "bitrate ladder". The audio signal is similarly divided into several audio channels and bitrates. The goal of ABR is to deliver the appropriate version of video and audio segments based on the capabilities of the receiving device and the available bandwidth. The entire streaming operation is thus converted to a series of file transfers (that can be supported by any Internet server) from the headend to the client devices. Rate selection is done by each individual client based on a manifest of rates provided by the ABR encoding head end.

Figure 1:
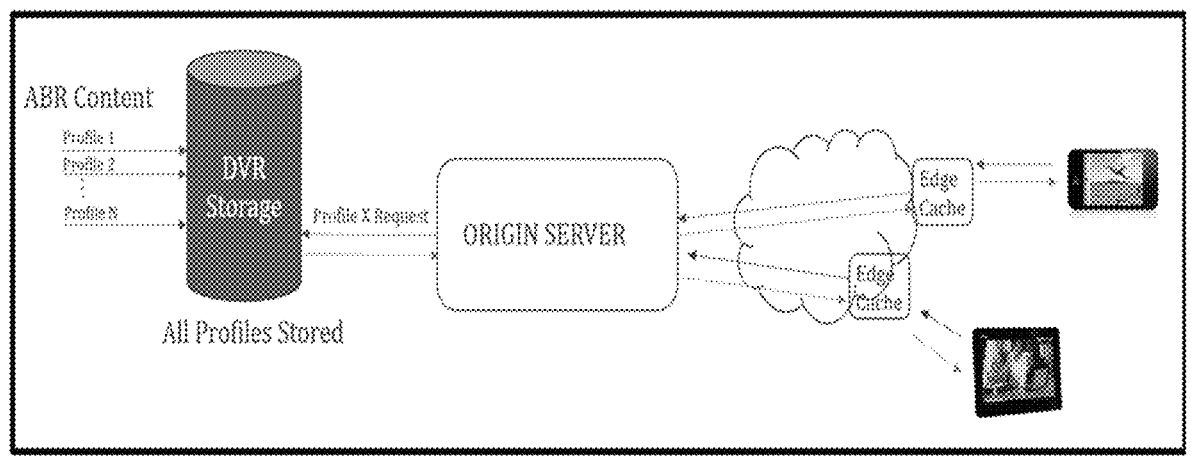
FIG. 1 illustrates an example of an Adaptive Bitrate (ABR) streaming system.

FIG. 1 shows a high-level view of an ABR streaming system 100 with a cloud DVR. The video/audio content is transformed into various profiles and kept in storage. When a device asks for this content, the Origin Server initially sends a manifest to the requesting device detailing the available profiles. The device, in turn, selects the profile that best fits its characteristics (such as 4K TV, HDTV, smartphone, laptop, and so on) and the bandwidth it has at its disposal, then requests that specific profile. If there are fluctuations in the available bandwidth, the device has the flexibility to request different profiles as needed.

As alluded to earlier, another key feature of this system 100 is the division of content into brief time segments. The advantage of this is that the device receiving the content can easily switch between profiles by just requesting the next small segment from a different profile. Common packaging formats in use are HTTP Live Streaming (HLS) and Dynamic Adaptive Streaming over HTTP (DASH). The process of packaging these segments can happen at various stages in the network: before the storage, after storage in the Origin Server, or at the edge of the network. Each of these packaging architecture options has tradeoffs with storage size, core network bandwidth, and edge cache complexity and edge storage.

Just-In-Time Packaging (JITP) is an enhanced version of packaging that's particularly efficient when various digital rights management (DRM) or packaging formats are required for different types of devices. In this setup, the original video and audio signals are stored just once, but they are packaged in real time to satisfy the specific needs of the receiving device. This method significantly cuts down on storage and bandwidth costs.

Bitrate Ladders

Streaming systems typically have many different resolutions and bitrate profiles available so that each client can stream the content efficiently. In FIG. 2, we show two example bitrate ladders in Table 200. In the first Static Ladder, 8 different profiles are provided in typical resolution and bitrate combinations. Static Ladders are often used in live systems. With a large number of profiles, the endpoint has more choices to choose a profile that dynamically matches its bandwidth and device type requirements. The downside of having these many profiles in the ladder is that the DVR storage requirement is high. This also may reduce the efficiency of the edge caches since more profiles may be stored at the edge.

In the Content Aware Ladder system, a smaller number of profiles are generated using "content-aware" encoding, which creates unique profiles based on the specific requirements of the content. For instance, a high-action movie may need different combinations of resolutions and bitrates than a news program featuring people simply talking. Video-on-Demand (VOD) systems are good candidates to employ a content-aware ladder. While Digital Video Recorder (DVR) systems might also use content-aware encoding, they may require re-encoding from the live signals.

The advantage of an Automated (content-aware) ladder is that it uses fewer profiles. This means a DVR system would use less storage, and the bandwidth needed by the Content Delivery Network (CDN) to deliver a certain video quality to a specific client could also be marginally reduced compared to the static ladder. In the provided example shown in Table 200, the content-aware ladder results in a 60% reduction in storage requirements.

In both the content aware ladder or static ladder, neither provides an optimal profile based on the end-client screen size or dynamically available bandwidth. Since both systems require transcoding to the ladder profiles and storing ahead of time in the DVR, the end client can only choose from a limited set of operating points. The static ladder provides more operating points so gives more choices for bandwidth options but requires more storage. The content aware ladder uses less storage but does not give as many options for bandwidth which creates less efficient streaming for certain end point devices.

For example, if an end client had available 1400 Kbps, the static ladder could provide the 540 p profile at 1200 Kbps, while the content aware could only provide 480 p at 811 Kbps, so in this case the content aware system actually produced worse quality than the static system.

The result is that neither of these solutions are ideal.

Blazar JITT

Just-in-Time Transcoding (JITT) is a system and a method where compressed video and audio signals are converted from one format to another at the precise moment when a request for the signal is made by a video or audio player (client). This necessitates that the transcoding system functions at a speed much faster than real time. Blazar, a JITT transcoder, possesses several unique characteristics, primarily its ability to transcode at a speed up to 100 times faster than real time. Blazar JITT is also dynamically scalable which allows for an array of new applications and use cases.

Blazar JITT fully leverages the latest developments in CPU and GPU technologies and makes optimal utilization of the various resources in both computational platforms. While JITT has been contemplated in the past, neither the computational power nor the SW architecture could achieve the types of consistent gains in speed for all the hybrid operations that Blazar is able to accomplish.

Blazar JITT Ladder

The most ideal bitrate ladder would be an "infinite" ladder, offering every possible profile. This would deliver the exact resolution and bitrate that aligns with the client device, the available bandwidth from the Content Delivery Network (CDN), and the type of content, thereby ensuring the highest video quality. This is precisely what the Blazar solution delivers.

Figure 3:
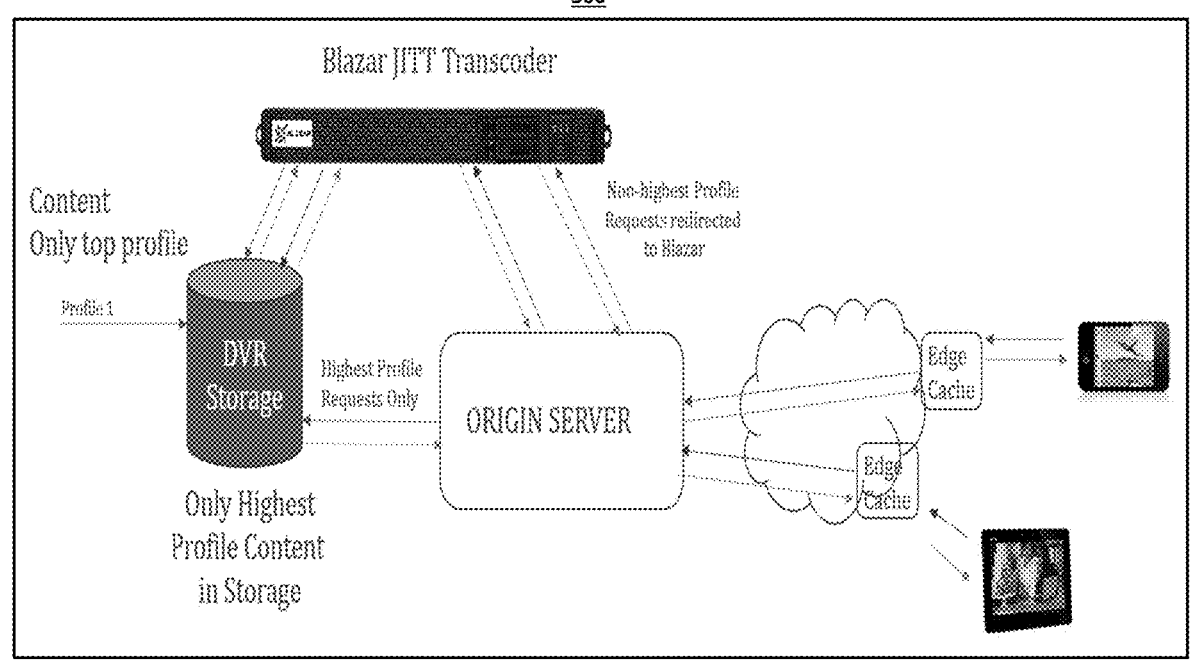
FIG. 3 illustrates an example of an ABR system with a Just-In-Time-Transcoder (JITT) to provide lower profiles according to an embodiment.

In the Blazar JTTT system, only the top most profile—the one with the highest resolution and bitrate—needs to be stored on the DVR storage system. When a client device requests the content, Blazar's Just-In-Time Transcoding (JITT) is capable of immediately converting the content to the best bitrate/resolution profile that suits the client's device type, available last-mile bandwidth, CDN bandwidth, and content type. The system architecture is shown in FIG. 3.

When the end device has sufficient bandwidth for the top profile, then the Origin can serve that profile directly from the DVR storage. When the endpoint needs to use less bandwidth, then the Origin re-directs the request to Blazar JITT which retrieves the top profile from storage and instantly transcodes it to the lower profile needed.

In practice an infinite ladder would lead to an infinitely large manifest file that the client would need to parse. Therefore, a practical approximation of an infinite ladder is to construct a ladder with 20-50 profiles, yet only the top profile media is preserved in the DVR storage. The current client can then select one from these 20 or more profiles and request it from the Origin server. Blazar is able to create the specific profile faster than real time. To the end device it appears as if the file was served from the storage server in the same amount of latency. In the future, the concept of static multiple bit rates with different profiles can be replaced by an intelligent client that can make segment by segment requests FIG. 4 shows an exemplary Table 400 where the new Blazar infinite ladder saves 84% storage compared to a static ladder, and 59% compared to a content aware ladder. It should be noted that independent of the ladder type, Blazar JITT can save the same amount of DVR storage since only the top profile is in storage.

To put this into perspective for some use cases. A 500-channel cloud HD DVR storing all the channels for 1 year would require nearly 30 PetaBytes with the static ladder, 11.3 PetaBytes with the Content Aware Ladder, and 7.7 PetaBytes with the Blazar system that only stores the top profile.

Figure 5:
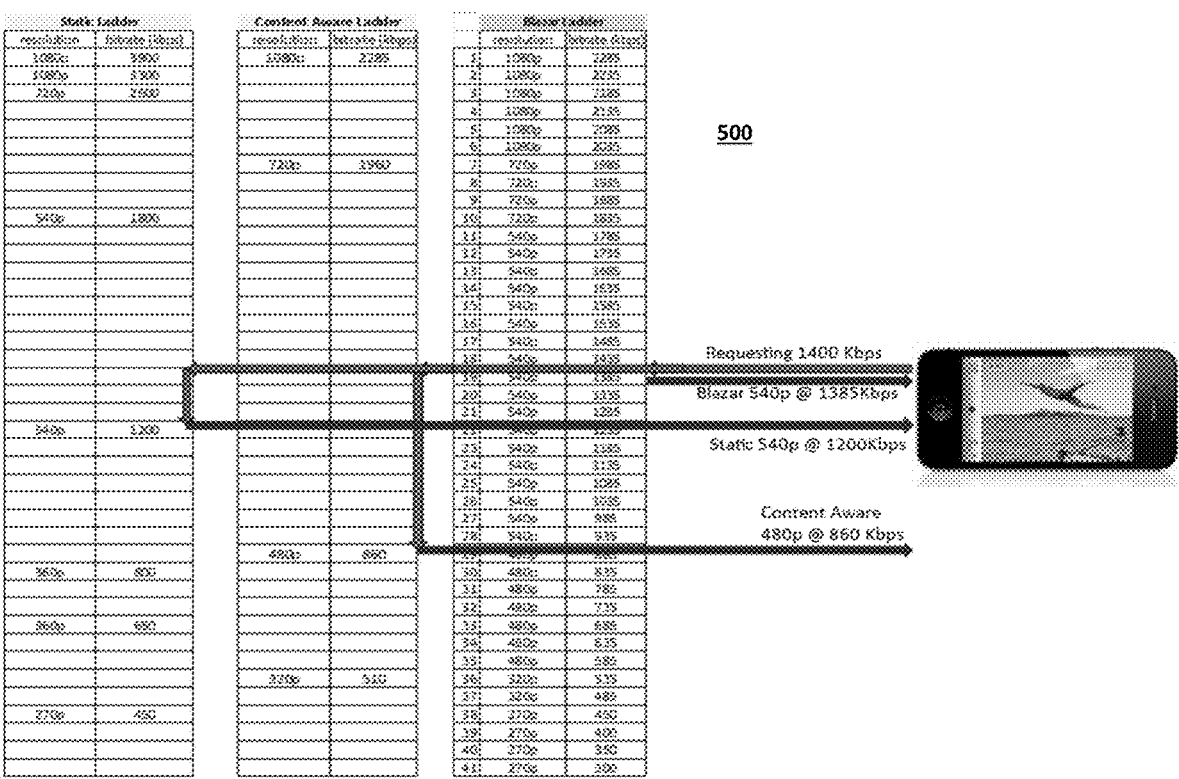
FIG. 5 illustrates an example of a Just-In-Time-Transcoder (JITT) virtual ladder vs. traditional static and content aware ladders.

FIG. 5 illustrates an example 500 of a 41 profile ladder with 50 Kbps increments between profiles. Using the example given earlier, where an endpoint device has 1400 Kbps available bandwidth, the Blazar ladder provides a near match at 1385 Kbps with 540 p resolution. Whereas the content aware ladder has nothing near 1400 Kbps and must provide a lower resolution 480 p at 811 Kbps. The static ladder has 1200 Kbps available at 540 p. Worse quality than Blazar.

This example demonstrates both advantages of Blazar JITT:

1) Lower Storage and bandwidth cost: Blazar JITT only stores the top profile

2) Better video quality and optimum for the system available bandwidth.

Blazar JITT Codecs

Another benefit Blazar JITT provides is an adaptable solution for the ever-evolving landscape of audio and video compression standards. During the codec transition phase, which typically lasts several years, both codec ladders need to be supported by the DVR for streaming to legacy and newer devices. In the past, this has always slowed the introduction of newer codecs in the marketplace. With Blazar JITT, the newer codec can be supported by Blazar JITT. When the number of client devices supporting the newer standard (which is usually more bandwidth efficient) reaches a critical mass, then the entire DVR library can be turned over to the newer codec and legacy devices are now supported with the same Blazar JITT. For instance, today H.264 is the most widely adopted video compression standard in client devices and set-top boxes, with newer devices increasingly integrating HEVC and AV1. The transcode conversion by Blazar would initially be from H.264 to HEVC/AV1. When the client population is more mature with HEVC or AV1, the library could be converted to that technology and all other devices would be supported by the Blazar JITT. This way, there is no requirement to pick technology winners early in the game as well.

HEVC and AV1 demonstrate bitrate efficiency surpassing H.264 by 50% or more. Consequently, employing these more efficient codecs when the end device supports them can result in significant savings in network bandwidth and edge cache storage.

Blazar broadens the concept of a bitrate ladder to encompass the video or audio compression format, effectively multiplying the effective ladder size by the number of codecs supported. A full Blazar ladder for every codec that is needed can be supported with still just a single codec and one top profile stored on the DVR storage.

This is not feasible with static or content aware ladders unless all the codec versions and associated ladders are stored which is an expensive proposition.

Blazar's dynamic ability to switch video codec formats offers several substantial benefits in terms of architecture and cost:

When end devices support more efficient codecs, Blazar can perform Just-In-Time Transcoding (JITT) to these lower bitrate codecs. This can lead to bandwidth savings or an enhancement in video quality for the end device.

The DVR storage can now maintain the highest profile in the most bitrate-efficient codec, with Blazar only transcoding to less efficient legacy codecs when an end device cannot support the newer ones. For instance, HEVC could be used for storing the highest profile in the cloud DVR. If an end device requires H.264, Blazar's JITT can transcode to H.264 for those specific devices, while transcoding to HEVC for devices that support it.

Blazar JITT Architecture and Implementation

Figure 6:
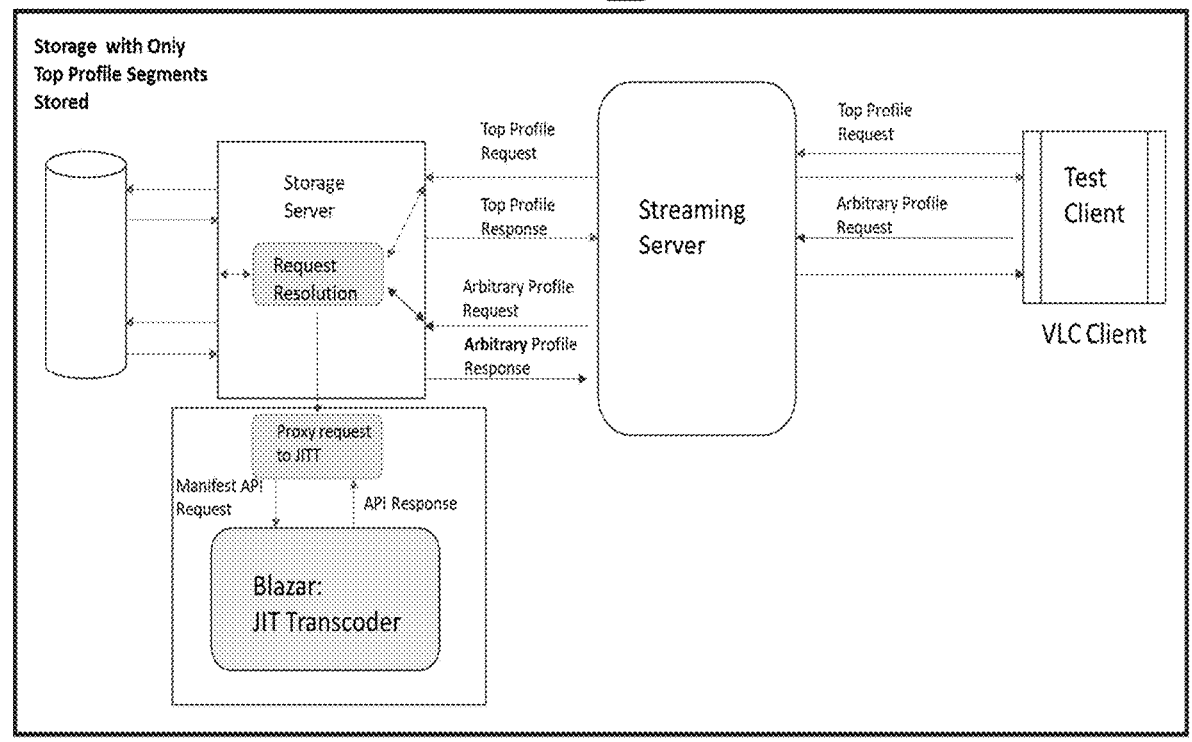
FIG. 6 illustrates an example of an arbitrary profile request and generation using a Just-In-Time-Transcoder (JITT) system and architecture.

FIG. 6 shows an exemplary innovative system and architecture 600 that generalizes and illustrates all the variants that have been discussed above. The Blazar JITT can accept an "arbitrary" profile request. The parameters that can be requested on the fly include any supported video or audio codec, bit rate, and resolution of the requested profile. This can be done on a segment-by-segment basis. An innovation is the computational architecture supported to enable the JITT with a predictable latency.

In FIG. 6, when the client device makes a content request, it is delivered a simple manifest that just shows the currently available profile in the store. Based on its bandwidth or computational availability, the client may request an arbitrarily lower profile or even a different codec. For example, if the profile stored is HD H.264 1280×720, 60 fps at 8 Mbps, and the available bandwidth is only 4 Mbps, the client device may have the intelligence to request a HD H.264 stream at 4 Mbps at the same resolution. In another example, if the currently available bandwidth is only 2 Mbps, the client may request an SD H.264 stream at 720×480 resolution. In another variation, when the currently available bandwidth is only 2 Mbps, the client may request an HD HEVC 1280×720 resolution stream at 2 Mbps.

In another example, the client may be constrained by computational power or ability to decode specific codecs. In this case, it can request a stream that is most suitable for its capabilities. For example, if the stored profile is a HD HEVC stream 1280×720 at 60 fps encoded at 4 Mbps, the client may request a HD H.264 segment at 60 fps and encoded at 8 Mbps because it is not capable of decoding HEVC streams. Such client requests may also be determined by the power constraints. For example, if the battery level on a mobile device falls below a threshold, the mobile client may request lower-level profiles with codec choices that are more power efficient. The client may even request lower resolution profiles at lower bit rates for the same reason. The power of Blazar JITT architecture is that such decisions made by the client can be done instantaneously on a segment-by-segment basis based on the each client's constraints. Traditional ABR systems have not supported different codec selection on a segment-by-segment basis. They also only support a limited set of pre-determined profiles with a single codec. With arbitrary profile requests, the Blazar JITT system guarantees the optimal profile delivery tailored to the bandwidth constraint and the computational power constraints of each client.

On-Demand ABR Profile Generation to Support Legacy Client

Currently, adaptive bit rate (ABR) system client starts out with making an asset request. It gets returned, from the streaming server, a manifest file that lays out the available profiles that can be requested. The profiles contain the bit rates and other relevant information on the media segments. In current systems, the number of profiles in the manifest is predetermined and determines the granularity with which client requests can be made.

In our contemplated use of Blazar JITT to support the legacy client, when the asset request is first made, the server returns a manifest with a fixed ABR profile set. The Client calculates the best ABR profile to receive based on the current bandwidth. An extension to this calculation could take into account the available power in the client since a lower profile will generally consume less battery power. When the client sends back a profile request for a segment (from the list of profiles in the manifest), the server determines if the top profile was requested. With the Blazar JITT architecture, this is the only profile that is available (either file or live source). If the top profile is requested, it is returned from the live or file source to the client. If a different profile has been requested, then the JITT is invoked to create the requested profile from the live or file source. The transcoded segment (per the requested profile) is then sent to the client.

An advantage with this architecture is that the master manifest can include a large set of available fixed profiles since the Blazar JITT will make them available when requested. Since all those profiles are not created/stored unless requested, the master manifest can have many more of them compared to a system without Blazar JITT which would have to create and store all the profiles ahead of time.

Smart Client Architecture & Implementation

In the new architecture, there is no predetermined set of profiles except a single top profile.

Figure 8:
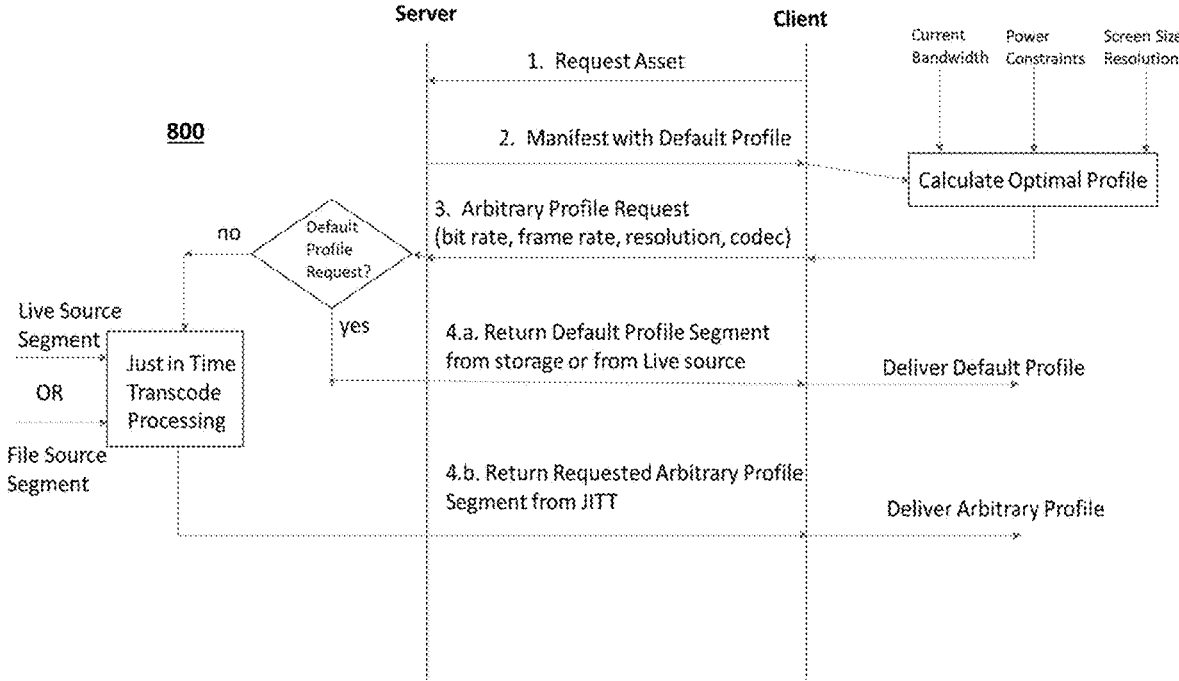
FIG. 8 illustrates an example of server-client interactions using a Just-In-Time-Transcoder (JITT) system and architecture to serve arbitrary profile requests.

FIG. 8 illustrates a typical client-server interaction flow 800. The exemplary flow is also described below:

1) The client requests a particular asset (may be live or file source that is "streamed" using file segments).

2) The server responds with a manifest containing a single default profile. In most applications, this will be presumed to be the top profile although in the most general case, this need not be the case.

3) Based on the default available profile, the Client then calculates the optimal profile it needs to receive as a function of available network bandwidth and its own compute power.

4a) If the conditions (network bandwidth and compute power) can support the default profile, the client requests the default profile from storage or the live source.

4b) If the conditions (network bandwidth and compute power) and the client device type (characterized by resolution and screen size) support a different profile, the client device requests the profile optimum for the client. In this case the server invokes the JITT transcoder to produce the specific requested profile.

Smart Server Architecture & Implementation

Figure 9:
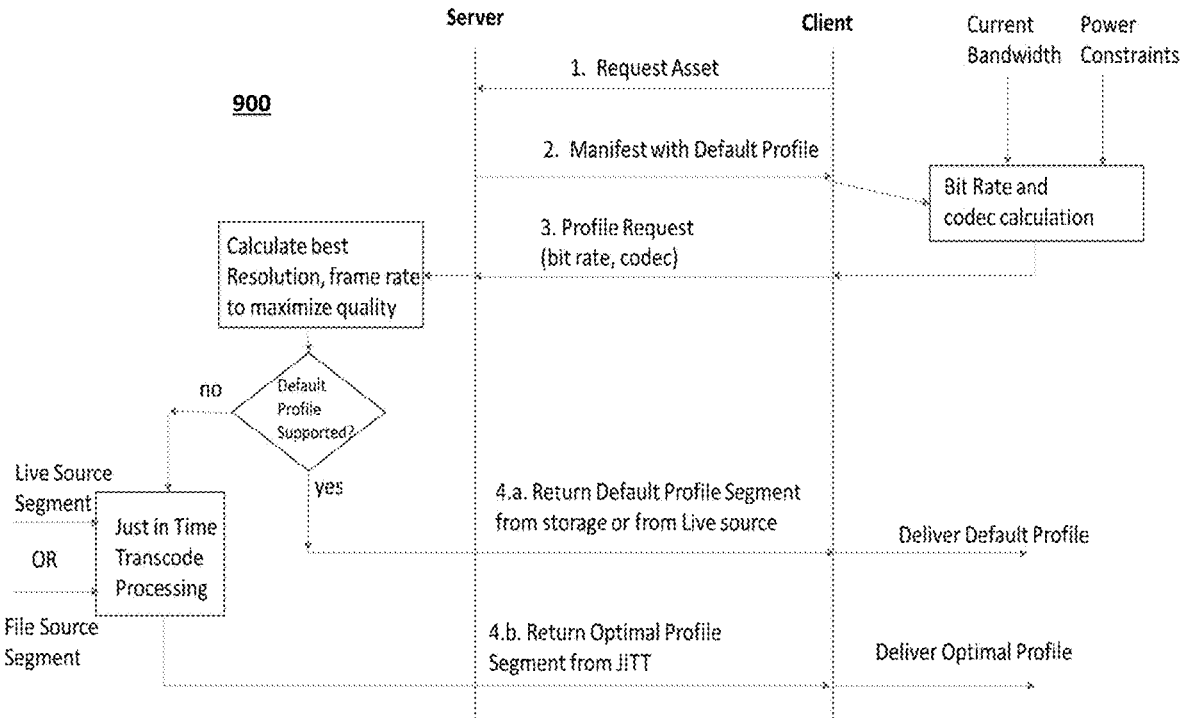
FIG. 9 illustrates an example of server-side optimal profile delivery using a Just-In-Time-Transcoder (JITT) system and architecture.

An alternative architecture to deliver optimal media based on the constraints of network bandwidth and client compute resources is to move the calculation of the segment characteristics to the server side. FIG. 9 illustrates this architecture.

In FIG. 9, the event flow 900 is pictured, as described below:

1) The client requests an asset

2) Server sends back a manifest with the default profile (as before).

3) Using the available network bandwidth, the client can determine a bit rate that it needs to request for the next segment or segments. Based on the power constraints at the client, it can determine a video compression codec that it can best decode. Both these pieces of information are sent back to the server.

4a) The server algorithm calculates the best resolution, frame rate based on the bit rate and codec choice from the client. If the default profile can be supported, then the server sends back the default profile from file or live source.

4b) If the server algorithm makes a choice other than the default profile, then the Just in Time Transcoder is invoked to create the arbitrary profile on the fly and deliver it to the client.

Note: The server may also know the client screen resolution, screen size (and perhaps other information) to also help determine the profile.

Architecture to Support Legacy Clients with JITT Server

In both the smart client and smart server architectures discussed above, there are semantic changes in the client or server workflows that are needed in order to leverage the arbitrary profile creation and optimal use of the system. We now discuss a legacy mode support architecture that accommodates legacy devices to still operate with the JITT and take advantage of near-optimal bandwidth use to deliver the best quality.

In this architecture, we revert back to creating a content aware architecture where the server provides the list of possible profiles to the client. The client, based on network bandwidth (and possibly power available) makes a profile selection from what has been presented to it. This requires none to very minimal changes in the legacy client software. The server will now have to decide if it needs to invoke the JITT (if the top profile has not been requested) and deliver the appropriately requested profile from the client.

Figure 7:
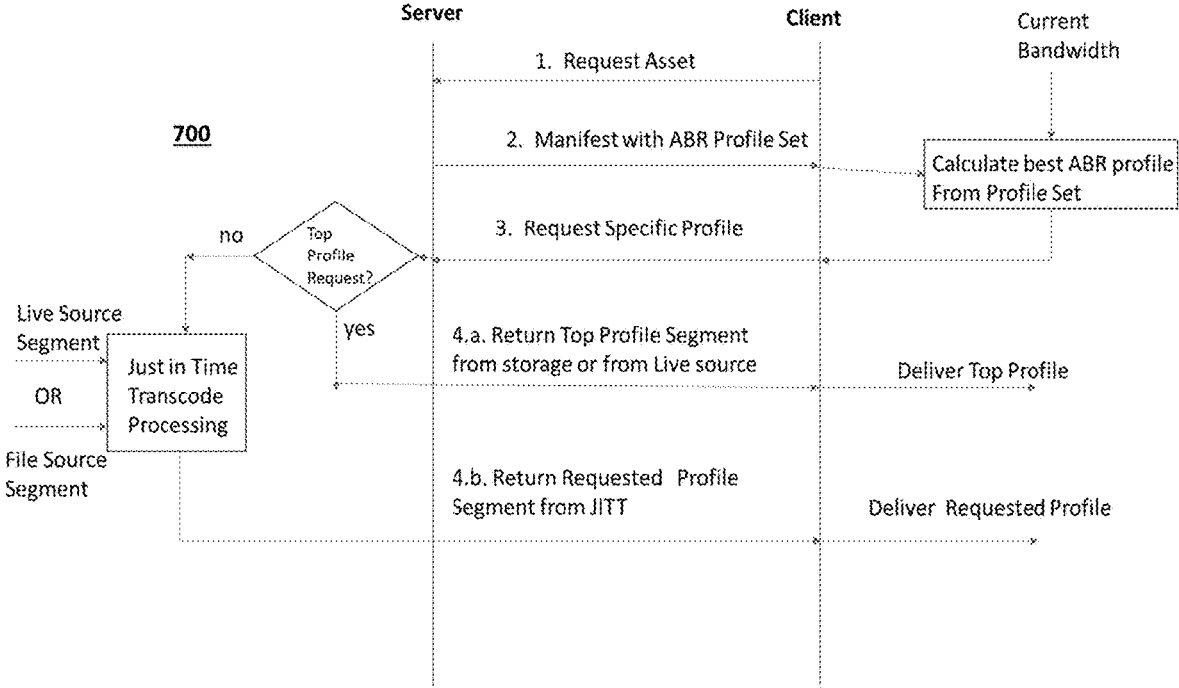
FIG. 7 illustrates an example of using a Just-In-Time-Transcoder (JITT) system and architecture for legacy clients.

FIG. 7 illustrates an implementation of Blazar JITT with a legacy client. The legacy client will receive, in the manifest, a list of available profiles. This is consistent with the normal operations of today's Adaptive Bit Rate client algorithms. Based on the available profiles, the client selects the best matched profile for reception and requests the same from the Blazar JITT server. If this is the top profile already in memory, the Blazar JITT just forwards that profile from memory. In case a different profile is requested, Blazar JITT transcodes the top stored profile to the requested profile on the fly and delivers to the client. While this is not the most optimal solution (since the instantaneous bit rate is not being used but only a list of bit rates as specified in the manifest), it still supports the notion of JITT and saves storage bandwidth at the server.

Variations on JITT Processing

Other variations of JITT could include delivery of a profile that is very similar to one requested by a different end client. The server determines that the profile requested by the current client matches very closely (but not exactly) another one requested by a different client and may choose to send the transcoded version of the different client. The threshold of difference in profile request can be set at the server. This choice obviates the need for an additional JITT of the segment.

It must be mentioned that all of the architectures for smart client and smart server extend in the same manner to JIT audio transcoding. Whether it is conversion between mono, stereo and 5.1 or higher channel audio formats or conversions between different audio codecs, the same principles of recreating the requested audio profile on the fly would apply.

Blazar and Edge Caches

The storage and core network bandwidth savings are even higher when the edge caches are considered. In an Adaptive Bitrate (ABR) video streaming system, a Content Delivery Network (CDN) and edge caches work together to deliver a smooth, high-quality viewing experience.

The edge caches store the different video profiles (different bitrates, codecs and resolutions) that make up the ABR ladder for a particular video. When a client device requests a video, the edge cache can quickly provide the version of the video that's most appropriate for the device's current network conditions, thus minimizing buffering and maximizing quality.

The device doesn't just request and stick with one profile but dynamically adapts to changing network conditions. When network conditions change, the client device may switch to a different profile (either higher or lower quality), which the edge cache should also have available.

This is why it is beneficial for edge caches to store all the profiles of the ABR ladder rather than just the one that the client device initially requests. By storing all profiles, the edge cache can quickly respond to changes in the client's network conditions and provide the most appropriate video profile.

Of course, this might not be the case for all systems. In some systems with severe storage limitations, the edge cache might store only the most requested profiles. But such a setup could lead to more cache misses and poorer performance if the network conditions change, and the client device needs to switch to a profile that the cache doesn't have.

Figure 10:
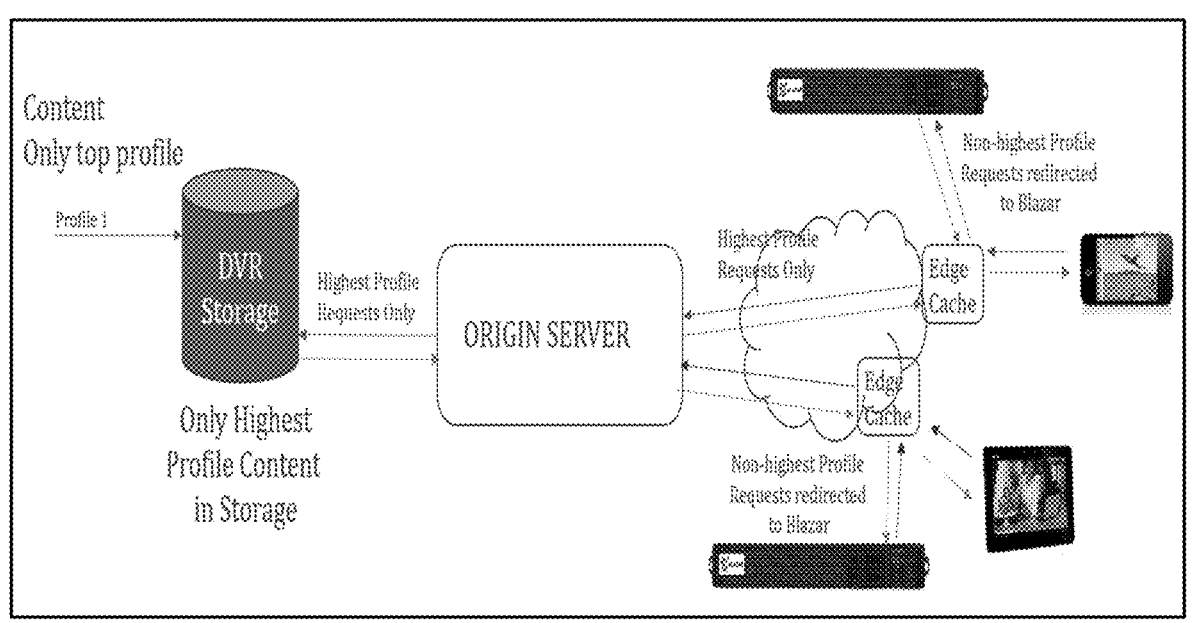
FIG. 10 illustrates an example of a Just-In-Time-Transcoder (JITT) system and architecture for edge caches.

Blazar JITT at the edge can greatly optimize such a system. FIG. 10 shows an ABR system with Blazar JITT used at the edge caches. In this case, the core network must store and forward the top profile to the edge caches for any video content. When an endpoint device requests a lesser profile, the blazar JITT can provide that on the fly, reducing the edge cache requirement to store all the profiles.

Therefore, the same storage savings as described before can be achieved at each edge point. Depending on the number of edge cache devices this can be a significant multiplying effect of edge cache storage savings. In addition, the network bandwidth from the origin to the edge has the equivalent percent savings since only the top profile needs to be pushed to the edge.

FIG. 10 shows the ABR system 1000 with a Blazar JITT implemented at the edge cache. When an endpoint device requests the top profile, then the origin provides that top profile from the DVR storage and the edge cache can cache it for future use. When an endpoint client requests a lesser profile then the edge cache redirects the request to Blazar JITT which retrieves the top profile from the Origin and then transcodes it to the desired profile the endpoint device requests.

The benefits of this JITT edge approach are multifold

Cache Hit Ratio will be twice or better with the same cache size. This is due to the cache only storing the top profile. (Alternatively, the edge cache storage size can be reduced by twice or more with the same cache hit ratio).

Network bandwidth from the edge cache back to the origin will be reduced by the effect of the edge cache hit ratio increasing. This reduces network capacity requirements on multiple components including switches, origin, and storage system.

As with the Smart Server or Smart Client architectures referred to in the previous discussion, the edge cache system can have a similar Edge Smart Server or a Smart Client to support the on-the-fly decision making.

In some cases, different clients might request similar but slightly different profiles. In this case, the cache or origin could decide to only generate 1 profile that would be used for both clients. This will reduce the load on the Blazar system and the cache/origin system as well. For example, if 2 clients request 2 bitrates that are within a small threshold different, then only the lower bitrate could be generated by Blazar and used for both.

Blazar JITT Design

Blazar JITT transcoder is a software solution that runs on standard Linux servers with GPU compute accelerator hardware. Blazar is available as a software component that can run on any cloud provider such as Google Cloud, AWS, Azure, OCI etc., or is available as an on-premise solution (sold as a software license or full turnkey server appliance).

Figure 11:
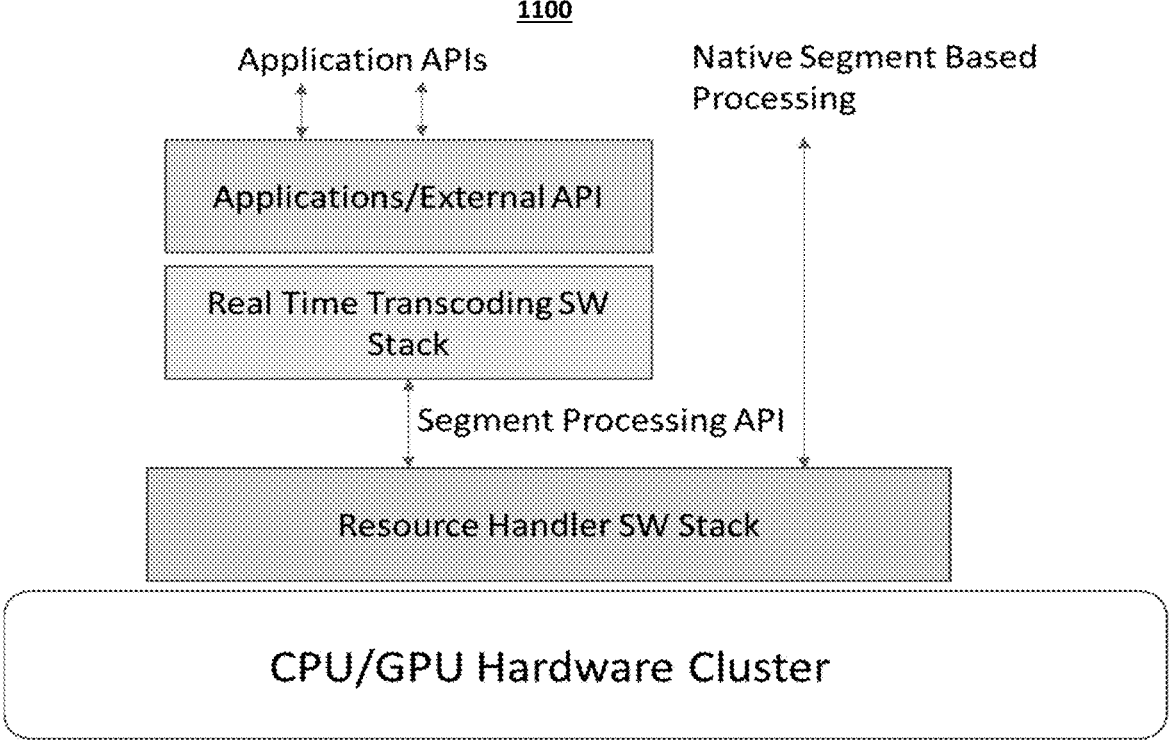
FIG. 11 illustrates an example of a software stack to optimally use GPU resources for a Just-In-Time-Transcoder (JITT) system and architecture.

FIG. 11 shows the software stack architecture 1100 that controls the underlying GPU hardware cluster. The Segment Processing API is a key enabler for managing segment based transcode processing of video streams. The underlying GPU hardware cluster resources are managed by the Resource Handler SW stack. The key innovation is to convert all forms of processing into segment-based chunks for efficient use of the underlying resources. The segments sizes can be of different lengths and can be used to support different codec choices. The resource handler receives, through its Segment Processing API, segment transformation requests. It allocates those requests to specific GPU pipelines that perform the transformation. Each GPU pipeline has an optimal number of slots to perform the transformations in an allotted amount of time. This entire infrastructure's resources are managed by the resource handler.

The Segment Processing API can also be used natively or invoked from a real-time transcoding SW stack that supports transcoding/processing applications via an external application API.

The Blazar Software stack is controlled from a simple but powerful API that can be integrated into any workflow. The API can be customized for certain use cases or workflows if needed. The hardware can also be selected for optimum cost/performance tradeoffs depending on the system workload.

In some use cases, it makes sense to have Blazar JITT nodes be dynamically spun up or down depending on workloads (peak viewing times for example). This can most easily be done in cloud deployments, but Blazar nodes can also be used as VOD transcoding resources in an on-premises deployment when not needed for Blazar functions.

For JITT operation, Blazar takes segmented default profile media files as input (usually fMP4 or MPEG-TS segments), and transcodes them fast enough for the end device playback to not be disturbed any more than if that end device was retrieving content from a storage server. A typical use case is 2 second media segments transcoded 10 times faster than real time which achieves this goal.

In some use cases more than 10× faster than real-time or greater transcode speed are needed and in those cases the Blazar hardware architecture must be scaled to support that. This can be done statically with the hardware deployment up front, or dynamically by combining Blazar JITT nodes together.

Figure 12:
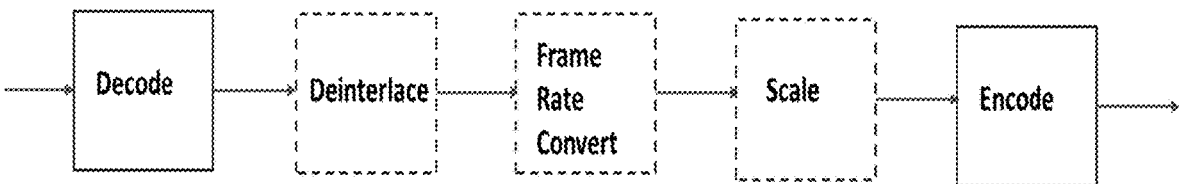
FIG. 12 illustrates an exemplary workflow process which may be utilized for an exemplary Just-in-time Transcoder.
Figure 13:
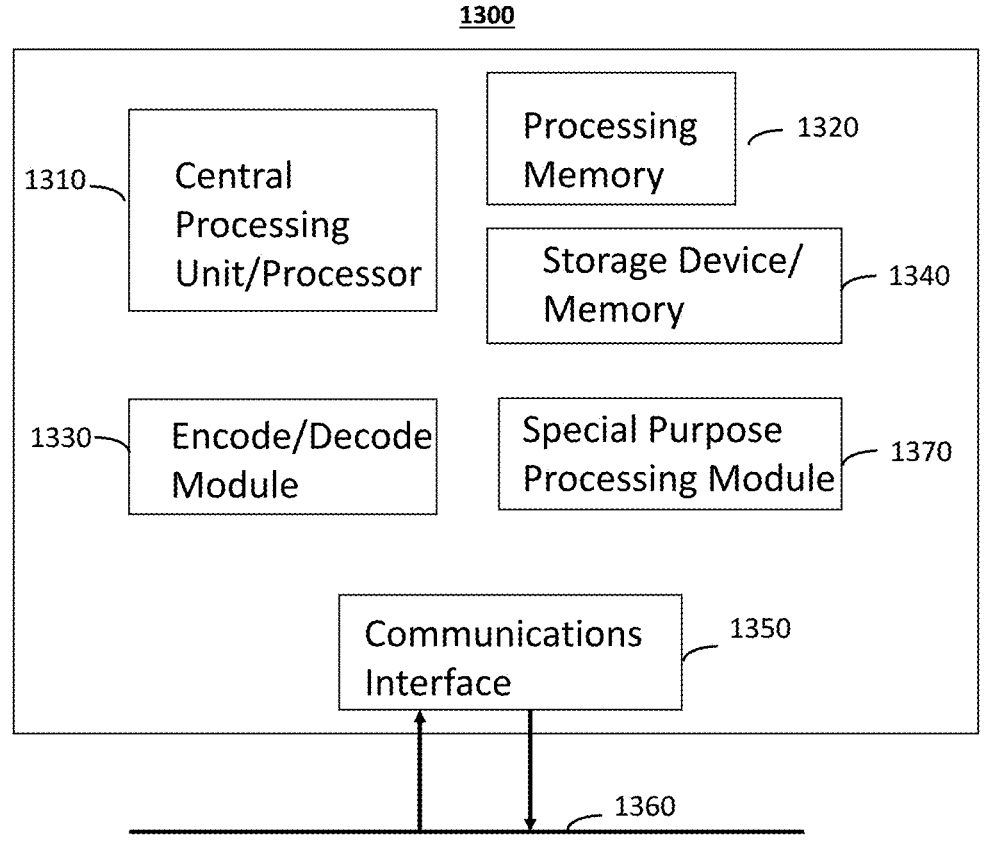
FIG. 13 illustrates a block diagram of an exemplary apparatus 1300 in which various aspects of the exemplary embodiments may be implemented.

FIG. 12 illustrates an exemplary workflow process 1200 which may be utilized for an exemplary Just-in-time Transcoder shown in FIG. 3, FIG. 6, FIG. 10, FIG. 11 and/or FIG. 13. Note that some of the processing elements shown in FIG. 12 may be optional (i.e., shown in dash lines) and may or may not be exercised depending on the input type and the required output or outputs.

The segment-in, segment-out, Just in Time Transcoding pipeline process 1200 has the following main processing blocks (as shown in FIG. 12):

Decode

Deinterlace

Frame rate convert

Scale, which may include overlay graphics, change pixel bit-depth

Encode

Also note that these exemplary processing blocks may be implemented in either hardware and/or software, as to be further described below.

Video Segments which contain compressed video may need to be transformed or processed. As an example, a typical video segment may be 2 or 6 seconds long. However, a segment may be designed to have an arbitrary time duration. A first processing is, e.g., decoding the video back to baseband frames. Based on the nature of the input video, and the requirements of the output video, the deinterlacing process may need to be used next. For example, if the input video is 1920×1080 pixels interlaced at 29.97 frames per second (standard 1080i signal that is used in television production in the US), but the output video needs to be progressive video frames, then the deinterlacing processing would be invoked.

Another optional processing is frame rate conversion. If the output frame rate is different than the input frame rate, then the frame rate conversion processing is invoked to create the right output frame rate. Typically, the frame rate at the output is the same or lower than the input, but the processing itself does not preclude a higher frame rate at the output than the input. The optional scaler processing is also used if the resolution of the output video is different from the resolution of the input video. Both up-conversion (higher output frame resolution) or down-conversion steps are possible with the scaling operation. Finally, once the correct format of the output is reached with the necessary processing steps, the video frames are compressed with the encoder.

In exemplary architectures, both the required processing (e.g., decode, encode) and the optional processing (e.g., deinterlace, frame rate conversion, scaling) may be implemented in hardware pipelines or in software engines with hardware acceleration components.

As mentioned earlier, present inventors recognized that the use of hardware or software tools to maximize the overall video processing throughput for Just-in-Time Transcoding may best be done with a segment-in-segment-out approach in which each segment is scheduled to run through the required pipelines in an optimal allocation. Given the potential hardware constraints of a platform, the primary goal of the resource handler software stack discussed in FIG. 11 is to make optimal allocations for execution of the specific JITT tasks on the available hardware resources.

Accordingly, present software and hardware implementations achieve processing speeds needed for JITT in various ways. In software and/or hardware implementations, the overall speed of execution improves with the progression and improvement of semiconductor technology which allows faster clock speeds, denser circuitry and advanced functions to be supported in the CPU execution (software) or hardware designs.

Beyond the improvement of processing speeds from advancements in semiconductors, various other innovative improvements are employed in the design of video processing to speed them up. Some of these improvements and advancements made include:

Extensive use of parallel processing of video frames or sub-frames. For example, in the CPU (software) case, each core of a multi-core CPU may be assigned a different video frame (or subframe) to process. The same approach can be used in hardware designs that have multiple copies of a processing function designed into the hardware. Since some of the processing functions can have a frame-to-frame dependency (or subframe to subframe dependency) this approach cannot be used for all algorithms to full parallelization. However, typically at least 2 or 3 frames, or subframes, can be processed in parallel for encoding, deinterlacing or scaling algorithms.

Depending on the segment lengths being processed, groups of frames may be processed in parallel. This often requires the group of frames to have certain constraints such as the first frame must be independently decodable (called Instantaneous Decoder Refresh or IDR frames).

Sub functions of the processing may also be separated, for example, both motion estimation encoding and variable length encoding may have separate CPU cores (or hardware blocks) running in parallel.

The larger the frame size and the larger the frame rate, more of these parallelization techniques need to be used. For example, since standard definition is approximately 6× less pixels per second to process than high definition, current CPUs or hardware encoders may already achieve much faster than real time performance for SD. However, HD and especially 4K and 8K resolution video needs to use these parallel processing.

Using one or more, or all of the above-described techniques, present disclosed software or hardware implementations are capable of 10× or better real-time speeds for HD and about 5× for 4K for the just in time transcoding.

For any underlying hardware, the resource consumed is proportional to the segment size being processed, the overall processing time constraint, the resolution of the compressed video input, frame rate of the video input and the video codec (for decode purposes), and the resolution of the video output, frame rate of the video output and the video codec (for encode purposes). In addition, the processing resources consumed are proportional to the optional processing components such as deinterlacer, frame rate converter and scaling function. For any given input segment, based on the processing request, it is thus possible to estimate the resources that would be consumed to process the specific task on the specific hardware platform. In addition, the JITT imposes constraints on how quickly a completed task must be presented to the requester.

Total resource consumed, $R_{total}$ can thus be expressed as:

$$R_{total} = \sum_{i=1}^{N} R_i,$$

where $R_i$ are the individual resources consumed by each of the individual processing elements and N represents the total number of processing elements needed for the specific segment processing task. The total time, $T_{total}$, consumed to process a segment will also depend on the individual mandatory (decode and encode) and optional (deinterlace, frame rate conversion, scaling) components that need to be utilized.

$$T_{total} = \sum_{i=1}^{N} T_i,$$

$T_i$ are the expected individual time taken for the specific tasks in the pipeline.

The overall goal is to minimize $R_{total}$ for each segment processing task subject to the constraint that $T_{total} < T_{spec}$ ($T_{spec}$ is the user specified time constraint within which the processing task must be completed).

There are two approaches to solving this problem. The first approach is a global optimization approach where all remaining distributed resources are made available to the optimizer which then finds the best resource (lowest $R_{total}$) for the current segment subject to the constraints on $T_{total}$ described in the previous paragraph. There is a latency incurred with this approach that may not be acceptable. Also, the algorithm will be optimal if executed at regular time intervals (so that multiple pending tasks can be optimally allocated). If the algorithm is run with every task, then the sub-optimal approach described below will approach the performance of the optimal approach.

A faster but more sub-optimal approach is to create a certain number of slots for each resource. Each slot corresponds to the ability of the resource to complete a JITT task within the time constraints. For example, a GPU may be allocated 8 processing slots (assuming a worst-case segment length and slowest codec output). This means that for up to 8 tasks (for a given segment length of video input) the system will be able to process and deliver the output within the time constraint. The overall scheduler then maintains two slot pools-one pool of slots that are currently processing jobs and the other pool that has free slots. The scheduler can simply in round-robin allocate jobs to the first free slot. When a task is finished, that specific slot is returned to the free slot pool. In the simplest implementation, there is a certain sub-optimality with this approach when the segment lengths are variable.

FIG. 13 illustrates a block diagram of an exemplary apparatus 1300 in which various aspects of the exemplary embodiments may be implemented. The apparatus 1300 may be embodied as a device including the various components described below and is configured to perform the processes described above. The apparatus 1300 may be communicatively coupled to other similar systems, and to a display via a communication channel 1360 as shown in FIG. 13 and as known by those skilled in the art to implement all or part of the exemplary video systems described above.

Various embodiments of the apparatus 1300 include at least one central processing unit or processor 1310 configured to execute instructions loaded therein for implementing the various processes as discussed above. The processor 1310 may include embedded memory, input output interface, and various other circuitries as known in the art. The apparatus 1300 may also include at least one processing memory 1320 (e.g., a volatile memory device, a non-volatile/non-transitory memory device). The apparatus 1300 may additionally include a storage device or memory 1340, which may include non-volatile memory/non-transitory memory, including, but not limited to, EEPROM, ROM, PROM, RAM, DRAM, SRAM, flash, magnetic disk drive, and/or optical disk drive. The storage device 1340 may comprise an internal storage device, an attached storage device, and/or a network accessible storage device, as non-limiting examples. The apparatus 1300 may also include an encoder/decoder module 1330 configured to process data to provide encoded video and/or decoded video, and the encoder/decoder module 1330 may include its own processor and memory.

In addition, the apparatus 1300 may also include a special purpose processing modules 1370 to provide functions such as resolution upscaling or downscaling, frame rate up or down scaling, bit depth scaling, deinterlacing, detelecine, rotation, graphics overlay, and other video or audio processing functions. In one embodiment, the special purpose processing modules 1370 is capable of processing the transcoding of video and or audio segments from one format to another with processing speed at multiple times (i.e., more than 1 times) that of the arrival rate of the video and/or audio asset. This greater than real time processing speed is achievable by taking advantage of the hardware and software architecture of the special processing module 1370, such as, e.g., by maximizing and/or efficient use of segment processing, parallel processing, and/or utilizing a global optimization approach of distributed resources, as already described above.

The encoder/decoder module 1330 represents the module(s) that may be included in a device to perform the audio and/or video encoding and/or decoding functions as described herein. As is known, such a device may include one or both of the encoding and decoding modules. Additionally, the encoder/decoder module 1330 may be implemented as a separate element of the apparatus 1300 or may be incorporated within one or more processors 1310 as a combination of hardware and software as known to those skilled in the art. Likewise, the special purpose processing module 1370 may represent the module(s) that may be included in a device to perform up or down resolution, frame rate or bit-depth scaling, deinterlacing, detelecine, graphics overlay, image rotation, color correction, or other generic video and/or audio processing functions as described herein. As is known, such a device may include one or more of the special purpose processing module(s). Additionally, the special purpose processing module 1370 may be implemented as a separate element of the apparatus 1300 or may incorporated within one or more processors 1310 as a combination of hardware and software, as known to those skilled in the art.

Program code to be loaded onto one or more processors 1310, 1330 and/or 1370 to perform the various processes described herein may be stored in the storage device or memory 1340 and subsequently loaded onto the memory 1320 for execution by the processors 1310, 1330 and/or 1370. In accordance with the exemplary embodiments, one or more of the processor(s) 1310, the memory 1320, the storage device 1340, the encoder/decoder module 1330 and the special purpose processing module 1370 may store one or more of the various items during the performance of the processes discussed herein above, including, but not limited to the input video, the decoded video, the bitstream, equations, formulas, matrices, variables, operations, and operational logic.

The apparatus 1300 may also include a communication interface 1350 that enables communication with other devices via a communication channel 1360. The communication interface 1350 may include, but is not limited to a transceiver configured to transmit and receive data from the communication channel 1360. The communication interface 1350 may include, but is not limited to, a modem or network card and the communication channel 1350 may be implemented within a wired and/or wireless medium. The various components of the apparatus 1300 may be connected or communicatively coupled together (not shown in FIG. 13) using various suitable connections, including, but not limited to internal buses, wires, and printed circuit boards.

The exemplary embodiments may be carried out by computer software implemented by the processor 1310 or by hardware, or by a combination of hardware and software. As a non-limiting example, the exemplary embodiments may be implemented by one or more integrated circuits. The memory 1320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1310 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A system for delivering at least one media asset, comprising:
at least one server;
at least one client device;
at least one just in time transcoder;
the at least one server is configured to deliver a manifest comprising a single default profile to the at least one client device, wherein the single default profile is a top most profile with highest resolution and bitrate available for the at least one media asset in the system;
the at least one client device is configured to calculate optimal asset attributes based at least on available bandwidth and screen resolution of the at least one client device, and is further configured to request, from the at least one server, an optimal asset profile with the calculated optimal asset attributes; and
wherein:
if the matching optimal asset profile requested is the single default profile, the at least one server is configured to deliver the matching optimal asset profile to the at least one client device to fulfill the request of the at least one client device; and
if the matching optimal asset profile requested is not the single default profile, the at least one just in time transcoder is invoked to produce the matching optimal asset profile requested by transcoding from the top most profile to fulfill the request of the at least one client device, and
wherein a processing speed of the transcoding from one format to another is at least multiple times faster than real-time arrival rate of the one format of the at least one media asset at the at least one just in time transcoder.

2. The system of claim 1, wherein the at least multiple times are at least 10 times.

3. The system of claim 1, wherein the transcoding from one format to another is by changing one or more of following attributes: 1) bit rate, 2) frame rate, 3) video compression codec, 4) audio compression code, 5) resolution, 6) overlay graphics, and 7) output pixel bit depth.

4. The system of claim 3, further comprising at least one asset storage device, wherein the at least one asset storage device is configured to store only the top most profile.

5. The system of claim 4, wherein the at least one server, the at least one just in time transcoder, and the at least one asset storage device are coupled together, and the at least one client device is coupled to the at least one server through a content delivery network.

6. The system of claim 1 wherein the at least one client device is coupled to the at least one just in time transcoder through an edge cache.

7. A method for delivering at least one media asset in a media delivering system, comprising:
delivering, by at least one server, a manifest comprising a single default profile to at least one client device, wherein the single default profile is a top most profile with highest resolution and bitrate available for the at least one media asset in the system;
calculating, by the at least one client device, optimal asset attributes based at least on available bandwidth and screen resolution of the at least one client device, and requesting from the at least one server an optimal asset profile with the calculated optimal asset attributes; and
wherein:
if the matching optimal asset profile requested is the single default profile, delivering, by the at least one server, the matching optimal asset profile to the at least one client device to fulfill the request of the at least one client device; and
if the matching optimal asset profile requested is not the single default profile, invoking the at least one just in time transcoder to produce the matching optimal asset profile requested by transcoding from the top most profile to fulfill the request of the at least one client device, and wherein a processing speed of the transcoding from one format to another is at least multiple times faster than real-time arrival rate of the one format of the at least one media asset at the at least one just in time transcoder.

8. The method of claim 7, wherein the at least multiple times are at least 10 times.

9. The method of claim 7, wherein the transcoding from one format to another is by changing one or more of following attributes: 1) bit rate, 2) frame rate, 3) video compression codec, 4) audio compression code, 5) resolution, 6) overlay graphics, and 7) output pixel bit depth.

10. The method of claim 7, further comprising, storing by at least one asset storage device, only the top most profile, and the transcoding from one format to another is transcoding using the stored the top most profile.

11. The system of claim 1, wherein the optimal asset profile represents a media asset segment.

12. The method of claim 7, wherein the optimal asset profile represents a media asset segment.

\*    \*    \*    \*    \*